Figure 1:
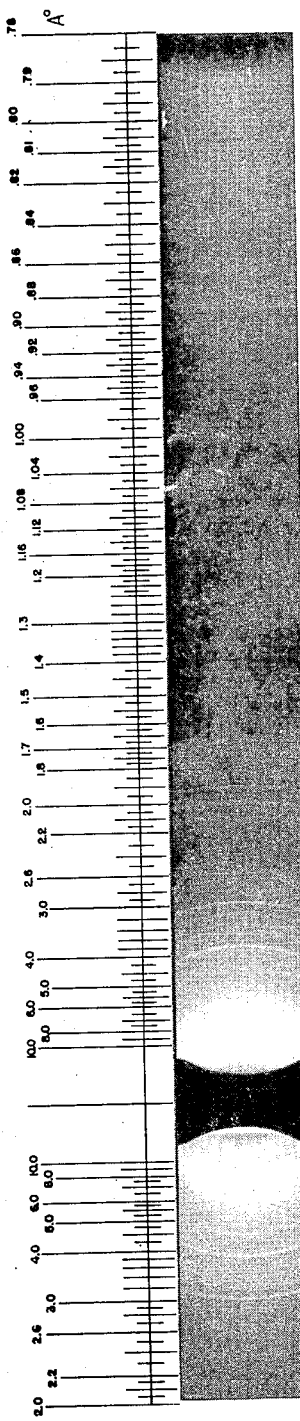

Aug. 16, 1966  J. C. MUHLER  3,266,996
ORAL COMPOSITIONS FOR CARIES PROPHYLAXIS
CONTAINING STANNOUS FLUOROZIRCONATE
Original Filed June 27, 1963

INVENTOR.
JOSEPH C. MUHLER,
BY
ATTORNEY 3,266,996
ORAL COMPOSITIONS FOR CARIES PROPHYLAXIS CONTAINING STANNOUS FLUOROZIRCONATE
Joseph C. Muhler, Indianapolis, Ind., assignor to Indiana University Foundation, Bloomington, Ind., a corporation of Indiana
Original application June 27, 1963, Ser. No. 291,173. Divided and this application July 28, 1965, Ser. No. 482,979
4 Claims. (Cl. 167—93)

This application is a division of copending patent application Serial No. 291,173, filed June 27, 1963.

This invention relates to a new composition of matter. More particularly it is directed to a novel compound, stannous fluorozirconate[tin(II)hexafluorozirconate] having the formula $SnZrF_6$. It further relates to improved oral compositions for caries prophylaxis containing this compound as an anticaries agent.

By the term "oral composition" is meant a product which in the ordinary course of usage is not intentionally ingested, but is retained in the oral cavity for a time sufficient to come in contact with substantially all of the dental surfaces. Such products include, for example, dentifrices, mouthwashes, dental proprylaxis pastes and topical solutions.

It is commonly recognized that the presence of small amounts of fluorine in drinking water has a pronounced effect in reducing the incidence of dental caries. Sodium fluoride has been introduced into public water supplies in a number of communities with good results. This method of providing fluorine is not feasible, however, where drinking water is obtained from small, private sources such as individual wells, etc., rather than from common public sources. Further, the addition of fluorine to common public sources is not always accepted or permitted.

Topical application of aqueous fluoride solutions by a dentist or dental hygienist provides an excellent measure of protection against caries. Various fluoride compounds have been employed in this manner, including sodium fluoride. Such topical treatments, although effective, are relatively expensive and thus not always available to persons desiring them.

Limitations on the availability of fluoride prophylaxis by way of water supplies or the dental office have led to extensive efforts to incorporate various fluoride salts in oral compositions for use in the home. Whereas sodium fluoride appears to be satisfactory as an anticaries agent when ingested or when applied topically by a dentist or dental hygienist it has proved to be of limited efficacy in oral products such as dentifrices.

Although a highly effective toothpaste containing stannous fluoride as the anticaries agent is commercially available, dental researchers have continued their efforts to find new and more effective anticaries agents for use in such products.

Accordingly, one of the objects of this invention is to provide a new and novel compound having a high degree of anticaries efficacy.

A further object is to provide compositions of matter for use in the oral cavity, containing this compound.

Another object of this invention is to provide improved oral compositions for caries prophylaxis which are highly effective in reducing the formation of dental caries.

Still another object is to provide an improved method of reducing the solubility of dental enamel.

Other objects and advantageous features will be obvious from the following detailed description and from the drawing.

It has now been found that a new compound containing the elements tin (II), fluorine, and zirconium can be prepared which is highly effective as an anticaries agent. When this compound is incorporated in oral compositions as an anticaries agent, greatly improved oral compositions for caries prophylaxis are provided.

In the drawing, FIGURE 1 represents an X-ray diffraction pattern for stannous fluorozirconate ($SnZrF_6$).

Figure 2:
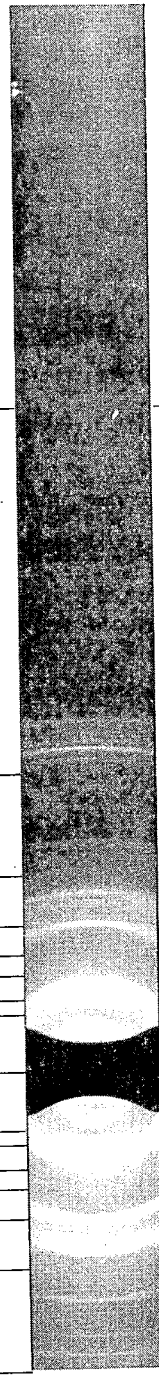
Figure 3:
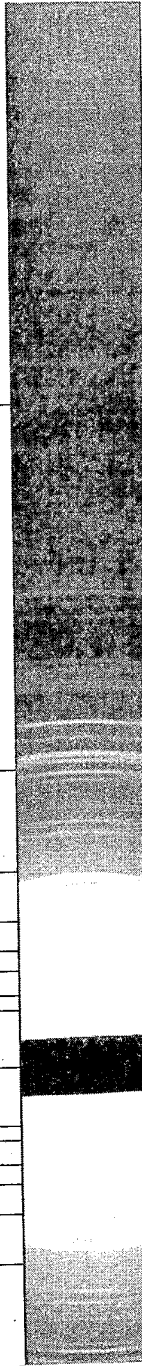

FIGURE 2 represents an X-ray diffraction pattern for zirconium fluoride ($ZrF_4$), and FIGURE 3 represents an X-ray diffraction pattern for stannous fluoride ($SnF_2$).

Stannous fluorozirconate is water-soluble and forms white, free-flowing crystals. It has a specific gravity of 4.21 and yields the distinctive X-ray diffraction pattern shown in FIGURE 1 which is readily distinguishable from the patterns of the salts from which it is prepared, i.e., FIGURE 2 and FIGURE 3. The diffraction pattern for stannous fluorozirconate shown in FIGURE 1 reveals strong lines corresponding to interplanar spacings of 3.85 A., 3.43 A., and 3.01 A. The $ZrF_4$ and $SnF_2$ diffraction patterns on the other hand reveal strong lines corresponding to interplanar spacings of 6.41 A., 3.96 A., and 1.85 A.; and 3.54 A., 3.18 A., and 2.28 A., respectively.

In general, stannous fluorozirconate can be prepared by reacting equimolar quantities of $SnF_2$ and $ZrF_4$ in aqueous solution and isolating the reaction product, or by heat fusion of these salts. A specific method of preparation is shown in the following example.

*Example I*

16.7 g. of $ZrF_4$ were placed in 1500 ml. of distilled water which was then heated until the $ZrF_4$ was completely dissolved. To this solution was added 1500 ml. of an aqueous solution containing 15.7 g. of $SnF_2$. The resulting solution was evaporated to dryness and the white chystalline residue was recovered and analyzed.

*Analysis.*—Calcd. for $SnZrF_6$: Sn, 36.65%; Zr, 28.16%; F, 35.19%. Found: Sn, 36.58%; Zr, 28.38% (by difference); F, 35.04%.

The three elements of which the compound of this invention is composed each appear to react with dental enamel and play a role in the anticaries efficacy of the compound. Anticaries efficacy was established in a clinical study conducted as follows:

A total of approximately 200 children between the ages 12 and 14 years were divided in accordance with past dental caries experience into two balanced groups. Each member of each group received a thorough dental prophylaxis before the clinical examination at which time a 7 film X-ray examination and a visual dental caries examination were undertaken. The children in Group I received a topical application of distilled water and those in Group II received a single topical application of a 16% by weight distilled water solution of $SnZrF_6$. The children were examined at 3 month intervals and the increments in the mean number of decayed, missing, or filled teeth ($\Delta DMFT$) and surfaces ($\Delta DMFS$) were recorded at each examination. The percent reduction in caries incidence was established at each interval by comparison with the water control group. The results of this study are set forth in Table 1.

*Table 1*

| | Group | No. (Children) | ΔDMFT | ΔDMFS | Percent Reduction | |
|---|---|---|---|---|---|---|
| | | | | | T | S |
| 3 month increment | I | 106 | 0.66 | 1.51 | | |
| | II | 102 | 0.03 | −0.24 | 99 | 124 |
| 6 month increment | I | 101 | .143 | 2.79 | | |
| | II | 101 | 0.11 | 0.15 | 93 | 95 |
| 9 month increment | I | 95 | 2.1$ | 4.25 | | |
| | II | 98 | 0.13 | 0.25 | 94 | 94 |

It can be seen that the topical application of stannous fluorozirconate in aqueous solution has a profound effect on caries incidence. There were no adverse effects resulting from application of these substances on either the teeth or gingival tissues. One of the desirable attributes of stannous fluorozirconate for the purpose of this invention is its capacity to reduce caries incidence without staining the dental enamel or causing gingival inflamation.

The compound of this invention can be applied to the teeth from simple aqueous solution; however, it is also suited for use in other oral compositions for caries prophylaxis which contain one or more ionically compatible adjuvants. Such compositions can contain from about 0.05% to about 50% by weight of stannous fluorozirconate. If less than about 0.05% of this compound is used the desired anticaries effect will not be attained. If quantities greater than about 50% are used, staining of the teeth may occur. In general, oral compositions which are designed for relatively frequent use in the home, such as dentifrices, will contain lower levels of stannous fluorozirconate than compositions which are applied infrequently such as prophylaxis pastes and topical solutions. Because of the reduced enamel staining and gingival irritating propensities of the compound of this invention relative to other tin compounds, higher concentrations and more frequent application are possible.

Dentifrice compositions containing stannous fluorozirconate constitute a preferred embodiment of this invention. Dentifrice compositions usually contain an abrasive, a sudsing agent and flavoring materials as basic components. For the purpose of this invention, it is desirable to employ abrasives and other components which do not react with the stannous, zirconium, and fluoride ions to render these ions unavailable for reaction with the dental enamel. For example, resinous abrasive materials such as particulate condensation products of melamine and urea or formaldehyde and the like which have a reduced tendency to form insoluble salts with or adsorb stannous, zirconium or fluoride ions can be used to advantage. A variety of preferred resinous abrasive materials are disclosed by Cooley et at. in U.S. Patent 3,070,510, granted December 25, 1962. Other abrasive materials which can be used in conjunction with stannous fluorozirconate include, for example, calcium pyrophosphate, calcium metaphosphate, calcium oxyapatite, α- and β- tricalcium orthophosphates, insoluble metaphosphates and alumina.

Toothpastes require a binder substance to impart desired texture properties. Although natural gum binders such as gum tragacanth, gum karaya, gum arabic, etc. and seaweed derivatives such as Irish moss and alginates can be used, sodium carboxymethylcellulose and hydroxyethyl cellulose are especially preferred. Improvements in texture can also be attained by including an additional material such as colloidal magnesium silicate in the formulation.

Suitable sudsing agents for use in a toothpaste include, but are not limited to, water-soluble alkyl sulfates having from 8 to 18 carbon atoms in the alkyl radical, such as sodium coconut monoglyceride sulfonate; salts of fatty acid amides and taurines such as sodium N-methyl palmitoyl tauride; and salts of fatty acid esters of isethionic acid, such as the oleic acid ester of sodium isethionate.

It is also desirable to include some humectant material in a toothpaste to keep it from hardening. Materials which can be used for this purpose include glycerine, sorbitol and other edible polyhydric alcohols.

Flavoring material can be employed in toothpaste compositions including small amounts of oils of wintergreen and peppermint and sweetening agents such as saccharine, dextrose and levulose. One of the advantages of the compound of this invention is that it permits greater flexibility in flavoring than is possible with stannous fluoride for example.

The pH of the aqueous oral compositions of this invention are preferably within the range from about 4.0 to about 5.5. Above about pH 6.0 stannous tin tends to react rapidly with other components of the composition and becomes non-available for reaction with the dental enamel because of the insolubility of the reaction products. If the pH is below about 4.0 the consumer properties e.g. sudsing and flavor are adversely affected.

The dentifrice compositions of this invention preferably contain from about 0.1% to about 1.0% by weight of stannous fluorozirconate.

As is well known, dental caries is caused, at least in part, by solution of dental enamel in biologically produced acids of the oral cavity; and decreasing the solubility of dental enamel in such acids can significantly reduce caries incidence. The effect of agents in reducing the solubility rate of dental enamel in acid can be determined by a variety of tests well known in the art, one such test being disclosed in Nebergall, U.S. Patent 2,882,204, granted April 14, 1959. In one of its aspects this invention provides a method of reducing the solubility of dental enamel comprising the application thereto of stannous fluorozirconate in aqueous solution.

Several representative oral compositions for caries prophylaxis are set forth in the following examples:

EXAMPLE II

A toothpaste was prepared having the following composition:

| | Percent by weight |
|---|---|
| Stannous fluorozirconate | 0.82 |
| Calcium pyrophosphate | 39.00 |
| Sorbitol | 20.00 |
| Glycerine | 10.00 |
| Sodium carboxymethylcellulose | 1.08 |
| Sodium coconut monoglyceride sulfonate | .81 |
| Sodium coconut alkyl sulfate | .70 |
| Flavor and minor ingredients | 1.84 |
| Water | Balance | pH 4.8

This toothpaste possessed good consumer properties and in a standardized test an aqueous slurry of the toothpaste yielded a 54.9% reduction in the solubility of dental enamel in acid.

EXAMPLE III

A toothpowder which embodies the invention is formulated as follows:

| | Percent by weight |
|---|---|
| Stannous fluorozirconate | 1.0 |
| Abrasive (melamine-formaldehyde particulate resin) | 95.5 |
| Sodium lauryl sulfate | 1.0 |
| Secondary sodium citrate | 1.0 |
| Flavoring | 1.3 |
| Saccharine | 0.2 |

This formulation is effective in caries prophylaxis, has good consumer qualities and remains active for long periods of time. The pH of the composition remains within the range from about 4.0 to 5.5 when diluted with water in the course of usage.

EXAMPLE IV

A mouthwash representative of the oral composition of this invention is formulated as follows:

| | Percent by weight |
|---|---|
| Stannous fluorozirconate | 2.0 |
| Ethyl alcohol (50%) | 84.5 |
| Flavoring | 5.0 |
| Sodium coconut alkyl sulfate | 7.5 |
| Acetic acid | 1.0 |

This composition constitutes an effective caries prophylactic when retained in the oral cavity 1 to 2 minutes each day.

Although the foregoing exemplifications of oral compositions for caries prophylaxis are directed to products which are ordinarily used in the home, it is to be understood that compositions which are usually applied in the dentist's office may constitute embodiments of this invention. For example, dental prophylaxis pastes containing conventional pumice and flavoring components can be modified to contain from about 5% to about 50% of stannous fluorozirconate and when used in the usual manner will be of exceptional value in caries prophylaxis.

While specific examples of oral compositions for caries prophylaxis have been set forth, it is understood that they are illustrative only and the invention is not limited thereto. Percentage values employed herein refer to percent by weight of the total composition.

What is claimed is:

1. An oral composition for caries prophylaxis comprising from about 0.1% to about 50% of stannous fluorozirconate and an ionically compatible carrier suitable for use in the oral cavity.

2. A dentifrice composition containing from about 0.1% to about 1.0% of stannous fluorozirconate.

3. A toothpaste effective in reducing the solubility of dental enamel comprising from about 20% to about 50% of a fluoride compatible abrasive and from about 0.1% to about 1.0% of stannous fluorozirconate, the pH of said composition being within the range from about 4.0 to 5.5.

4. The method of reducing the solubility of dental enamel comprising the application thereto of stannous fluorozirconate in aqueous solution.

No references cited.

LEWIS GOTTS, *Primary Examiner.*

RICHARD L. HUFF, *Assistant Examiner.*